United States Patent
Cole et al.

(10) Patent No.: US 11,014,240 B2
(45) Date of Patent: May 25, 2021

(54) ROBOT HAVING DYNAMIC SAFETY ZONES

(71) Applicant: ABB Schweiz AG, Baden (CH)

(72) Inventors: Gregory A. Cole, West Hartford, CT (US); Mark Ruth, Macomb, MI (US)

(73) Assignee: ABB Schweiz AG, Baden (CH)

( * ) Notice: Subject to any disclaimer, the term of this patent is extended or adjusted under 35 U.S.C. 154(b) by 345 days.

(21) Appl. No.: 16/122,439

(22) Filed: Sep. 5, 2018

(65) Prior Publication Data

US 2019/0262993 A1  Aug. 29, 2019

Related U.S. Application Data (60) Provisional application No. 62/554,338, filed on Sep. 5, 2017.

(51) Int. Cl.
*B25J 9/16*  (2006.01)

(52) U.S. Cl.
CPC ............ *B25J 9/1676* (2013.01); *B25J 9/1674* (2013.01); *B25J 9/1697* (2013.01); *G05B 2219/39082* (2013.01); *G05B 2219/39091* (2013.01); *G05B 2219/40202* (2013.01)

(58) Field of Classification Search
None
See application file for complete search history.

(56) References Cited

U.S. PATENT DOCUMENTS

| | | | | |
|---|---|---|---|---|
| 2011/0298579 A1* | 12/2011 | Hardegger | ............. | G01S 17/10 340/3.1 |
| 2012/0182419 A1* | 7/2012 | Wietfeld | ................ | F16P 3/142 348/137 |
| 2017/0001316 A1* | 1/2017 | Katayama | ............. | H05B 45/00 |
| 2017/0001317 A1* | 1/2017 | Katayama | ............. | H05B 47/10 |
| 2017/0320212 A1* | 11/2017 | Frisk | ................ | G05B 19/4061 |
| 2017/0326734 A1* | 11/2017 | Iida | ....................... | B25J 13/085 |
| 2017/0357242 A1* | 12/2017 | Watanabe | ............. | B25J 9/1666 |

FOREIGN PATENT DOCUMENTS

| | | |
|---|---|---|
| DE | 102005011143 A1 | 9/2006 |
| EP | 2395274 A1 | 12/2011 |
| WO | 2010088934 A1 | 8/2010 |

* cited by examiner

*Primary Examiner* — Robert T Nguyen
(74) *Attorney, Agent, or Firm* — Taft Stettinius & Hollister LLP (57) ABSTRACT

A robot is disclosed which includes a dynamic safety zone feature capable of defining a space around the robot to be monitored to provide safe operating conditions for personnel or property. The dynamic safe zones can be a volume around one or more moving components of the robot. Such dynamic safe zones can be scaled depending on the nature of the operation (fast moving robot having a larger dynamic safety zone). Multiple different zones can be used in some embodiments. The zones can further be scaled depending on the nature of the sensors used in the operation of the robot. Multiple different moving components can have different dynamic safety zones.

17 Claims, 6 Drawing Sheets

ROBOT HAVING DYNAMIC SAFETY ZONES

TECHNICAL FIELD

The present invention generally relates to robot safe zones, and more particularly, but not exclusively, to robot safe zones that can change during operation of the robot.

BACKGROUND

Providing safe zones for robots remains an area of interest. Some existing systems have various shortcomings relative to certain applications. Accordingly, there remains a need for further contributions in this area of technology.

SUMMARY

One embodiment of the present invention is a unique dynamic safe zone for a robot. Other embodiments include apparatuses, systems, devices, hardware, methods, and combinations for determining dynamic safe zones for robots. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
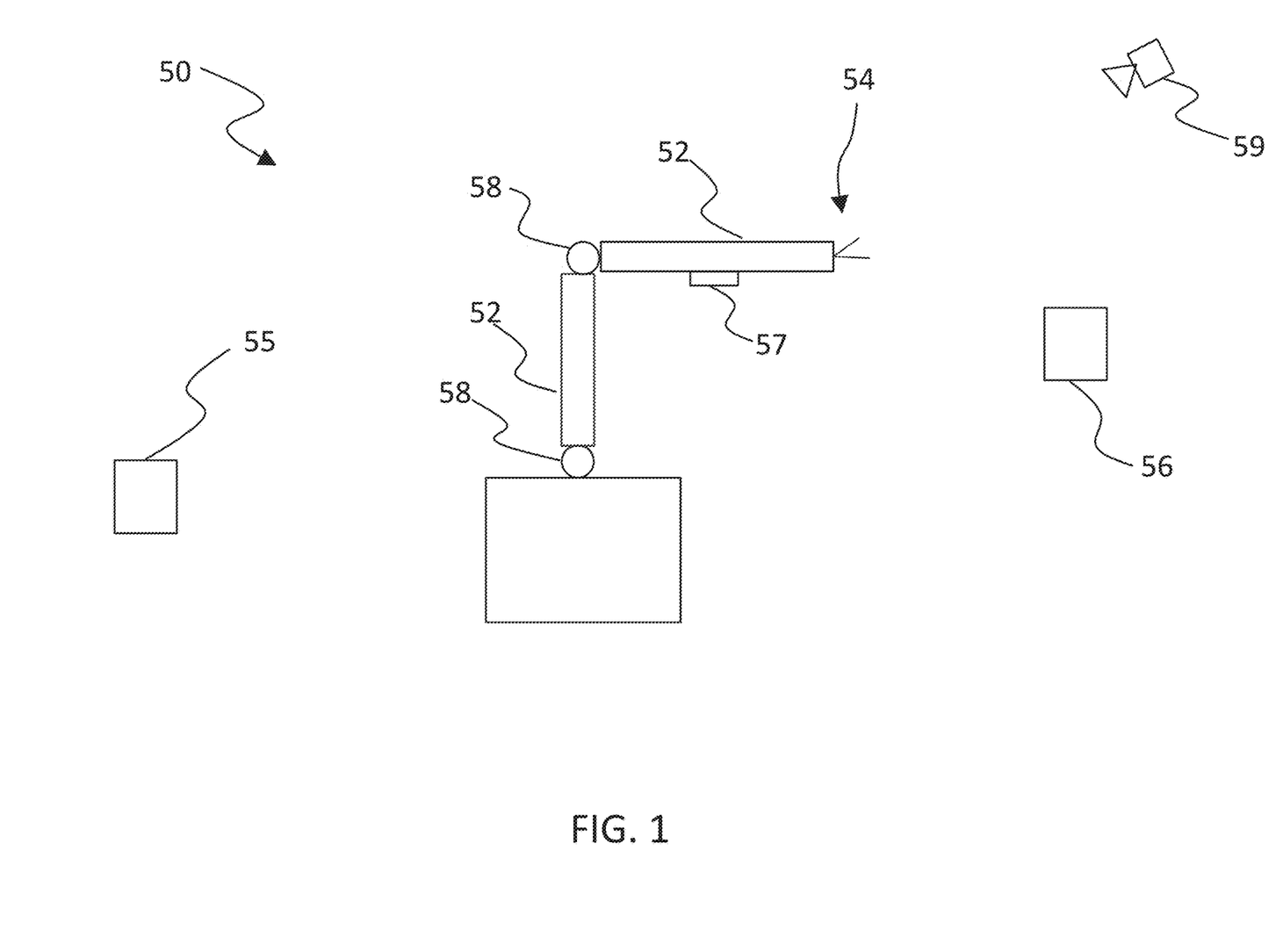
FIG. 1 depicts an embodiment of a robot.

With reference to FIG. 1, a schematic of a robot 50 is shown which includes a number of moveable robot components 52 along with an effector 54 useful to manipulate and/or sense a target 56. The robot 50 can be mobile in some embodiments, but other embodiments the robot 50 can be mounted upon a stationary base (e.g. FIG. 1). The robot components 52 can take any variety of forms such as arms, links, beams, etc which can be used to position the effector 54. The robot 50 can include any number of moveable components 52 which can take on different sizes, shapes, and other features. The components 52, furthermore, can be interconnected with one another through any variety of useful mechanisms such as links and gears 58, to set forth just two examples. The components 52 can be actuated via any suitable device such as electric actuators, pneumatic or hydraulic pistons, etc. The effector 54 can take any variety of forms such as a gripper, suction effector, belt, etc.

The robot 50 can be controlled via a controller 55 which can be local to the robot 50, or stationed at a remote location. Proprioceptive sensor 57 and exteroceptive sensor 59 can be used to provide the controller 55 with information suitable for operating the robot 50. Examples of proprioceptive sensors include position and rate gyros, position transducers, cameras, accelerometers, strain gauges, etc. Examples of exteroceptive sensors include cameras, radar, light curtains, etc. Other types of proprioceptive and/or exteroceptive sensors are also contemplated herein.

Figure 2:
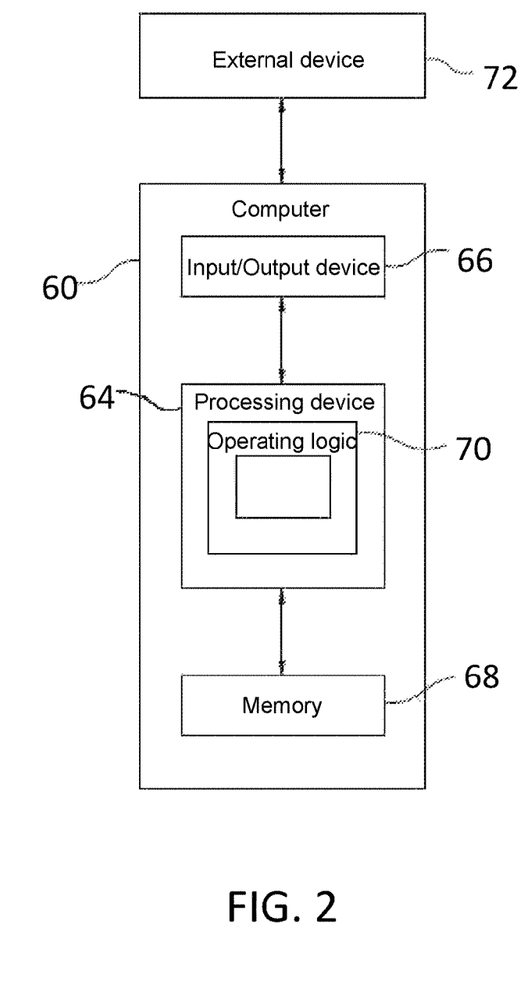
FIG. 2 depicts an embodiment of a computer capable of operating a robot.

Turning now to FIG. 2, and with continued reference to FIG. 1, a schematic diagram is depicted of a computer 60 suitable to host the controller 55 for operating the robot 50. Computer 60 includes a processing device 64, an input/output device 66, memory 68, and operating logic 70. Furthermore, computer 60 can be configured to communicate with one or more external devices 72.

The input/output device 66 may be any type of device that allows the computer 60 to communicate with the external device 72. For example, the input/output device may be a network adapter, network card, or a port (e.g., a USB port, serial port, parallel port, VGA, DVI, HDMI, FireWire, CAT 5, or any other type of port). The input/output device 66 may be comprised of hardware, software, and/or firmware. It is contemplated that the input/output device 66 includes more than one of these adapters, cards, or ports.

The external device 72 may be any type of device that allows data to be inputted or outputted from the computer 60. In one non-limiting example the external device 72 is any of the sensors 57 and 59. To set forth just a few additional non-limiting examples, the external device 72 may be another computer, a server, a printer, a display, an alarm, an illuminated indicator, a keyboard, a mouse, mouse button, or a touch screen display. Furthermore, it is contemplated that the external device 72 may be integrated into the computer 60. For example, the computer 60 may be a smartphone, a laptop computer, or a tablet computer. It is further contemplated that there may be more than one external device in communication with the computer 60. The external device can be co-located with the computer 60 or alternatively located remotely from the computer.

Processing device 64 can be of a programmable type, a dedicated, hardwired state machine, or a combination of these; and can further include multiple processors, Arithmetic-Logic Units (ALUs), Central Processing Units (CPUs), or the like. For forms of processing device 64 with multiple processing units, distributed, pipelined, and/or parallel processing can be utilized as appropriate. Processing device 64 may be dedicated to performance of just the operations described herein or may be utilized in one or more additional applications. In the depicted form, processing device 64 is of a programmable variety that executes algorithms and processes data in accordance with operating logic 70 as defined by programming instructions (such as software or firmware) stored in memory 68. Alternatively or additionally, operating logic 70 for processing device 64 is at least partially defined by hardwired logic or other hardware. Processing device 64 can be comprised of one or more components of any type suitable to process the signals received from input/output device 66 or elsewhere, and provide desired output signals. Such components may include digital circuitry, analog circuitry, or a combination of both.

Memory 68 may be of one or more types, such as a solid-state variety, electromagnetic variety, optical variety, or a combination of these forms. Furthermore, memory 68 can be volatile, nonvolatile, or a mixture of these types, and some or all of memory 68 can be of a portable variety, such as a disk, tape, memory stick, cartridge, or the like. In addition, memory 68 can store data that is manipulated by the operating logic 70 of processing device 64, such as data representative of signals received from and/or sent to input/output device 66 in addition to or in lieu of storing programming instructions defining operating logic 70, just to name one example. As shown in FIG. 2, memory 68 may be included with processing device 64 and/or coupled to the processing device 64.

The operating logic 70 can include the algorithms and steps of the controller, whether the controller includes the entire suite of algorithms necessary to effect movement and actions of the robot 54, or whether the controller includes just those necessary to receive data from the camera 58, determine a point cloud, utilize object recognition (discussed further below), and resolve position of the objects relative to a frame of reference keyed to the robot 54. The operating logic can be saved in a memory device whether of the volatile or nonvolatile type, and can be expressed in any suitable type such as but not limited to source code, object code, and machine code.

Figure 3:
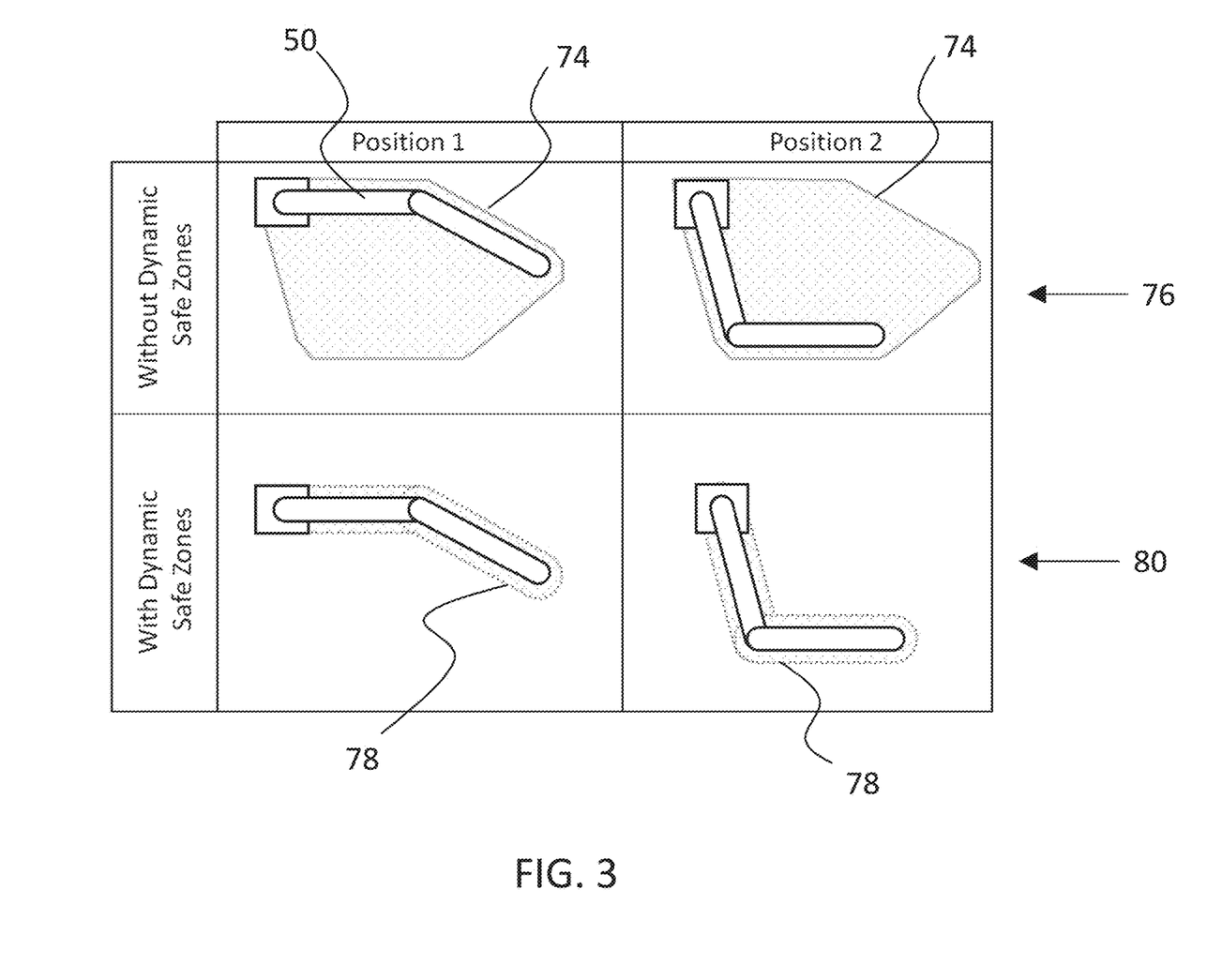
FIG. 3 depicts differences between static and dynamic safety zones.
Figure 4:
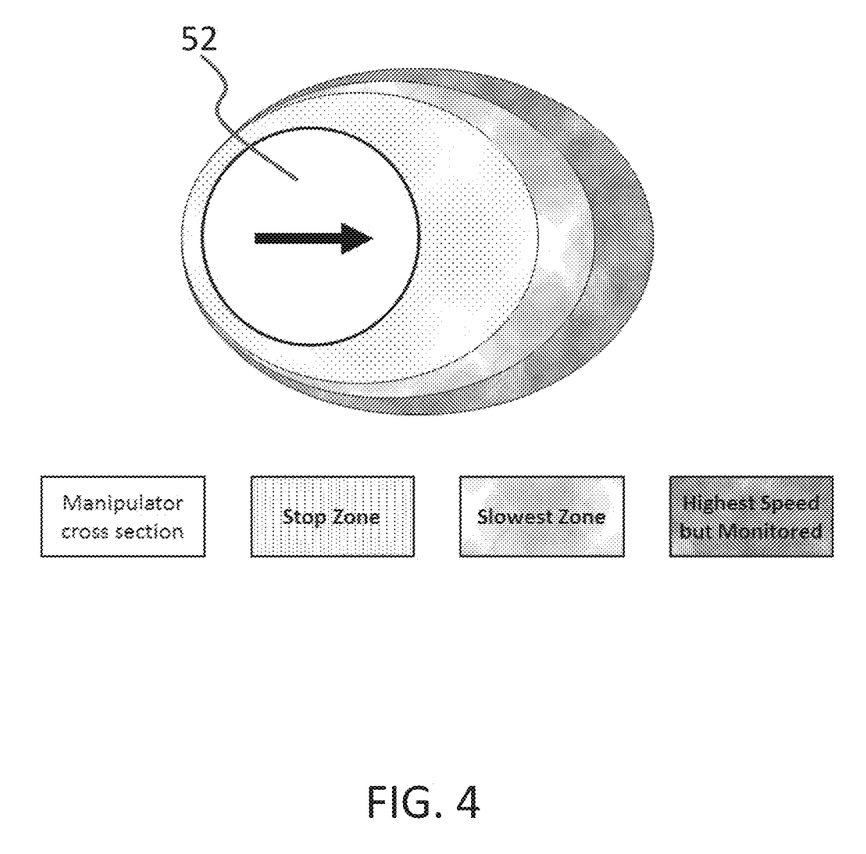
FIG. 4 depicts an embodiment of dynamic safe zone.

The controller 55 can include a number of features structured to provide a dynamic safe zone which can be monitored to alter behavior of the robot 50 if people or property intrude upon the safe zone. Turning now to FIGS. 3 and 4, illustrations are provided to further describe some features of the dynamic safe zones described in detail further below. FIG. 3 depicts a robot arm extended into a first position (Position 1) and a second position (Position 2). In a known approach to defining a safe zone around the robot 50, a static safe zone 74 is defined in row 76 in which the robot 50 is allowed to operate. The safe zone 74 is dubbed 'static' because it is structured to remain the same regardless of robot position/orientation/operation within the safe zone. If a person were to intrude into the static safe zone 74, the robot 50 can be commanded to cease operation by the controller 55 until the person exits.

The instant application provides for the ability to produce one or more dynamic safe zones 78 as illustrated in one embodiment shown in row 80. The safe zone 78 is dubbed 'dynamic' because it can be changed during one or more portions of operation of the robot 50. In the contemplated embodiments of the instant application, a person can intrude into spaces near the robot 50, and so long as the person does not intrude into the dynamic safe zone 78, the robot 50 can continue to operate. As such, sensors (e.g. 57 and/or 58) can monitor operation of the robot 50 as well as the proximity of a person to the robot 50 (and/or to any particular component 52), and if necessary the controller 55 or other pertinent device can adjust the size and/or shape of the dynamic safety zone 78 to determine the nature of the robot 50 actions.

The dynamic safe zone 78 includes a number of attributes and can take a variety of forms. In general the dynamic safe zone 78 can include a safe "front" that acts as a boundary that demarcates the safety zone from normal operation zone. Such a "front" can take a variety of shapes and be defined in a number of different manners. For example, the safety front can be a closed 2-dimensional path around a portion of an object, it can be an enclosed volume surrounding at least a portion of an object, it can be a line or plane that demarcates a linear distance offset from the object, etc. In some forms the dynamic safe zone 78 can change during the course of execution of the robot 50, for example it can grow and shrink as the robot 50 accomplishes various tasks and moves through its workspace (e.g. a robotic cell).

One nonlimiting form of a dynamic safe zone 78 is shown in FIG. 4. The safe zone 78 is depicted in two dimensions in the illustration across a cross section of the robot component 52, but it will be appreciated that such a zone 78 can be volumetrically extended around the component 52 as needed. The dynamic safe zone 78 is composed of three different areas, a stop zone 82, a slow zone 84, and a normal monitored zone 86.

In some forms of the present application the robot 50 can use the expected safe zone requirements to modify the motion pathway to accommodate an impingement on a safe zone requirement preventing a halt or slow down. These real time, dynamic modifications to motion planning and execution can be informed by several sources of information including:
  Position sensing and monitoring system inherent to the robotic system;
  External monitoring sensors such as light curtains, lidar, radar etc;
  Force sensing mechanisms inherent to the robotic system; and
  Sensing information provided by environmental feeds & component mounted sensors.

The present application can be used to dynamically integrate a number of exteroceptive and proprioceptive sensor feeds to build a model of safe motion areas and rules that updates based on an understanding of the level of knowledge of operation of the system with corresponding degrees of safety and movement margins associated with it. The robot 50 and accompanying systems can be portable across a wide variety of styles of implementations of robotic systems, while still maintaining safe operation. A few nonlimiting features of the present application are as follows:
  1) A dynamically generated set of safe zone rules that is updated on the fly in response to external input and internal system monitoring
     a. A method of creating dynamic safe zone rules based on planned motion profiles (also, the dynamic safe zone rules can be recalculated in real-time based upon changes in planned profile)
     b. A method of updating safe zone rules based on detected deviations in operations (e.g. differences in planned motion, changes in mass such as might result from picking up a target)
     c. A method of updating safe zone rules based on detected manipulator system parameters
  2) A system for receiving sensor input from a variety of internal and external sensors to generate an updated model representation of the physical system
     a. A method for classifying the reliability (and accuracy, cycle time, run rate, etc) of sensor information and correspondingly scaling the effect this sensor information has on safe zone rules (to account for different levels of sensor accuracy and cycle time)
     b. A method for registering sensor input sources with respect to each other such that the manipulation system and all sensor input can be considered on a single global coordinate system.
  3) A method for generating continuous safety rules, as opposed to differentiated "slow zones" and "stop zones"
     a. Maximum acceptable velocity changes continuously in a volume around manipulation system based on motion direction, inertia, effective available power to reduce motion components.
  4) Offline analysis of safety rule triggers and operational parameters to create optimized motion plans based on interaction with system by operators and unexpected events (e.g. if dynamic safety zones occur frequently in one direction of robot swing, data from the system can be used to determine an alternate planned motion route).

As also discussed further herein, the safe zones around the robot can be based on the physical dimensions of the robot as well as the predicted parameters of motion and the potential for modification of motion based on impingement of the safety zones. A figure of a simplified example of a cross section of a safe zone rule is shown in FIG. 4.

As can be seen in the nonlimiting embodiment of FIG. 4, the central circle can represent a physical cross section of a moving member of the robotic system. The expanding textured ovals represent different safe zones, tied to the coordinate system of the moving robotic component. Note that the safe zone geometry can be based both on the shape of the cross section as well as the direction of motion. It can be imagined that the instantaneous velocity of each portion of the robot can be calculated as well as the effective available power of the manipulation system and the systems inertial and mechanical properties. These properties can be used to derive the shape and size of the different safe zone sections. Other information can also be used in addition, such as compliance of joints, momentum effects of the components, etc. In one form the dynamic safe zones can be calculated in 3 dimensional space, as opposed to 2 dimensional space, thus creating safe zone volumes with appropriate rules.

The various embodiments associated with item 1) listed above will be understood to include techniques capable of providing dynamic safe zones using either real-time calculated and/or updating previously defined safe zones based on responses to external input and internal system monitoring. The technique described in item 1) a. will be understood to include defining a dynamic safe zone based upon a motion profile. Such dynamic safe zone can apply to the entire motion profile, and in some forms include zones having different sizes depending on the location within the motion profile. The motion profile can be defined by a start time and end time in some embodiments, it can be defined over discrete time intervals of the motion profile, and/or can be defined over time periods in which a specific robot motion dominates the robot activity (for example, robot motion that dominates can include arm rotation in one direction over a given time period, actuator displacement in another direction over a given time period, or target load onboarding/discharging in which any of these can occur either separately and/or concurrently). The dynamic safe zones can thus be a function of the motion profile where the profile may result in different "safe fronts" and/or volumetric zones depending on the location within the motion profile (collectively referred to as an envelope).

When the motion profile includes several different types of motions, multiple different dynamic safe zones can be created. The zones can include relatively larger or smaller "safe fronts" or volumetric zones as a function of the motion profile. To set forth just a few nonlimiting examples: the controller can define a dynamic safe zone during a first part of the motion profile which is relatively smaller than the dynamic safe zone over a later part of the motion profile. Differences in the dynamic safe zones can reflect differences in speed of motion between those parts of the motion profile, differences in amount of load imparted to the actuation system, and/or the likelihood of presence of personnel during portions of the motion profile. The controller 55 can automatically calculate the dynamic safe zones based upon previously determined relationships (e.g. a predefined relationship between momentum of robot components and available actuation horsepower to halt robot movement, or one based entirely on speed, etc). In some forms the controller 55 can recommend dynamic safe zones to an operator as a function of location within the planned motion profile.

The technique described in item 1) b. will be understood to include updating dynamic safe zone based upon deviations from a defined and/or predicted operation. As above, the dynamic safe zone can apply to the entire motion profile, and in some forms include zones having different sizes depending on the location within the motion profile. The motion profile can be defined by a start time and end time in some embodiments, it can be defined over discrete time intervals of the motion profile, and/or can be defined over time periods in which a specific robot motion dominates the robot activity (for example, robot motion that dominates can include arm rotation in one direction over a given time period, actuator displacement in another direction over a given time period, or target load onboarding/discharging in which any of these can occur either separately and/or concurrently). The dynamic safe zones can thus be a function of the motion profile where the profile may result in different "safe fronts" and/or volumetric zones depending on the location within the motion profile.

When the motion profile is updated as a result of operator definition, operational impediment, or other requirement and/or event, the dynamic safe zones defined over the motion profile can also be changed. For example, when an operator updates or changes the motion profile (either in whole or in part), the dynamic safe zones can be updated to reflect the change in motion profile. The change in dynamic safe zone can be automatically determined by the controller 55, or can be updated by an operator. For example, when the robot is expect to perform a new movement within the motion profile which is much faster than a previous movement over the same working space, the controller 55 can update the dynamic safe zones applicable to robot operation. Such change can include shrinking or expanding the "safe front" or volumetric zone as a function of the change. To set forth just a few nonlimiting examples: a 10% change in robot speed can result in a corresponding change in the "safe front" or volumetric zone to maintain a corresponding safety margin (e.g. faster speeds require a larger envelope), or a heavier than expected load can result in a change in robot performance and thus an expanding front or volumetric zone in which safe operation occurs. The updated dynamic safe zone change can be limited to the impacted portion of the motion profile (e.g. where the movement was changed or the load is borne), or may apply to the entire profile. The changes in dynamic safe zones can occur automatically by the controller 55, while in other embodiments the operator can update the dynamic safe zone in manually, or can confirm a suggested change based on the calculation performed by the controller 55.

The technique described in item 1) c. will be understood to include updating dynamic safe zone based upon detected system parameters of the robot. As above, the dynamic safe zone can apply to the entire motion profile, and in some forms include zones having different sizes depending on the location within the motion profile. The motion profile can be defined by a start time and end time in some embodiments, it can be defined over discrete time intervals of the motion profile, and/or can be defined over time periods in which a specific robot motion dominates the robot activity (for example, robot motion that dominates can include arm rotation in one direction over a given time period, actuator displacement in another direction over a given time period, or target load onboarding/discharging in which any of these can occur either separately and/or concurrently). The dynamic safe zones can thus be a function of the motion profile where the profile may result in different "safe fronts" and/or volumetric zones depending on the location within the motion profile.

The system parameters useful to determining when to update dynamic safe zones include any parameter, or combination of parameters, useful to predict robot performance. Such parameters can include values related to robot performance (e.g. rise time, settling time, latency of commands, etc), component level performance (electric currents related to an electromechanical actuator when subjected to a given commend, etc), communications (e.g. latency of commands, etc), etc. Certain values of robot related parameters can predict high levels of performance, and thus a smaller dynamic safe zone may be used during operation of the robot. The system parameters can be measured, estimated, etc, To set forth just one nonlimiting example, 10% change in robot dynamic rise time can result in a corresponding change in the "safe front" or volumetric zone to maintain a corresponding safety margin. High values of communication latency can also result in a larger dynamic safety zone, such as might be the case in a communication lag of transmission/reception of a sensor that detects the presence of a person in a robot zone of operation.

The change in dynamic safe zone can be automatically determined by the controller 55, or can be updated by an operator based upon the measured/estimated/etc change in robot system/performance parameters. The changes in dynamic safe zones can occur automatically by the controller 55, while in other embodiments the operator can update the dynamic safe zone in manually, or can confirm a suggested change based on the calculation performed by the controller 55.

In any of the embodiments described above, multiple dynamic safe zones defined over the motion profile can be blended to smoothly transition from one "safe front," volumetric zone, etc to another "safe front," volumetric zone, etc. The transitions in safe zones over the motion profile can take any variety of forms and be blended using any variety of techniques, whether or not those techniques meet a subjective notion of blended. Furthermore, the techniques and embodiments described above with respect to 1) a., 1) b., and 1) c. can be combined with each other, in whole or in part.

The technique described in item 2) a. will be understood to include the ability to assess the ability of sensors to provide information to the controller 55 useful to enact the dynamic safe zones, and thereafter alter the dynamic safe zones as a result of the assessment. Such assessment can be performed prior to developing a motion profile, but may also be determined real-time to update the dynamic safe zones. The assessment can include a determination of reliability, accuracy, cycle times, run rates, etc. To set forth just a few nonlimiting examples, if a sensor is deemed to be unreliable (e.g. determined via redundancy fault checking), the use of that sensor to either adjust the dynamic safe zone or determine intrusion into the dynamic safe zone can be adjusted. A sensor feed with low reliability can give rise to a larger dynamic safe zone. In similar fashion, a sensor with low accuracy and/or low sample rate can give rise to larger dynamic safe zones. A relationship can thus be built and carried with the controller 55 for adjusting the dynamic safe zones as a function of the sensor reliability characteristics (e.g. accuracy, sample rate, etc). The controller 55 can determine the sensor characteristic and, using the predetermined relationship, adjust the dynamic zone accordingly. Some characteristics of the sensors may have one or more levels to which the dynamic safe zone is adjusted. If a sensor has high, medium, or low reliability that can give rise to a first, second, and third dynamic safe zone adjustment. The adjustments to the dynamic safe zones can be incremental across all of the different sensor feeds, or the adjustments can be a one-size-fits-all approach. Furthermore, some levels of adjustments can be incremental, while other levels of adjustments are one-size-fits-all.

As has also been described above with respect to item 2) a., a method for inputting and associating a variety of sensors and sensor systems into the described system is also contemplated herein. In order to integrate an additional sensors input, it must be positioned within the space, then registered to the global coordinate system of the operating environment. In order to accomplish this, transformations between the coordinate system of all sensor, and the manipulator system with the selected global coordinate system, can be established and calibrated. Information from the sensors, such as sensor accuracy, resolution, data rate, latency, etc can be used to build the dynamic safe zone. A sensor with low resolution or accuracy. A diagram depicting the manipulation system, multiple sensors, and their respective coordinate systems is depicted in FIG. 5.

Figure 5:
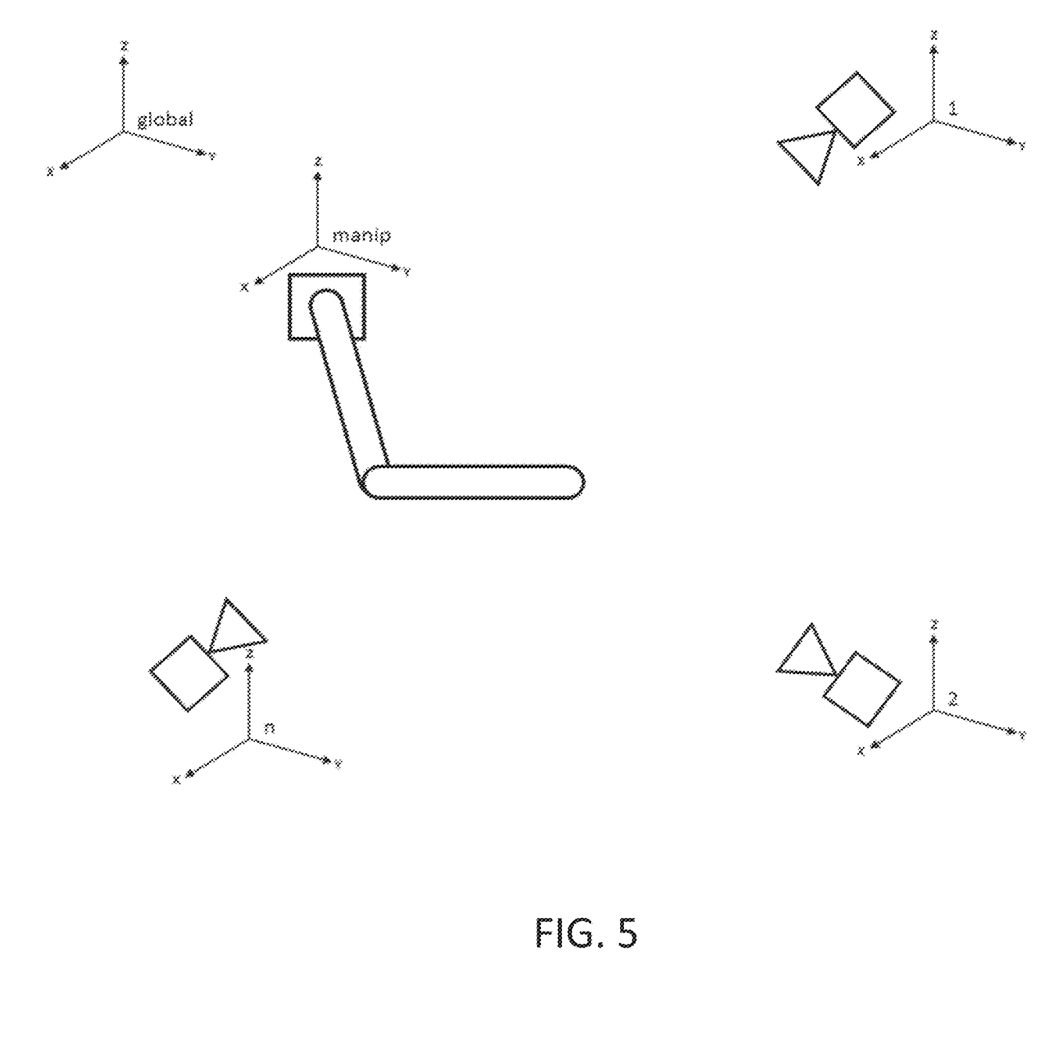
FIG. 5 depicts a robot and sensors.

As can be seen in FIG. 5, once the sensors are positioned such that they can observe the operating space, their coordinate systems and transformations to the global coordinate system can then be established to aid in operation of the robot 50 using dynamic safety zone 78. Once the systems and transformations are established, parameters about the sensing system can be assessed to determine how input from the sensing systems should be treated with respect to their ability to trigger the safety system. This is so sensors of varying accuracy and cycle time can be used to establish safety rules without degradation of the safety of the environment.

The technique described in item 3) will be understood to include the ability to generate a continuous safety zone in lieu of the demarcated zones as described in FIG. 4. The continuous zone can be created using a relationship between a safety criteria, robot performance, and/or sensor characteristics. The relationship can be functional in nature and can represent a degradation in robot speed as a person or foreign object intrudes into the continuous space. To set forth just a few nonlimiting examples, the continuous zone can reduce robot speed in direct proportion to how far a person or unwanted object is to the robot (e.g. the smaller the distance the slower the robot speed). Other examples of making the dynamic safety zones continuous can be based on the direction of motion of the robot, inertia of the robot with and without a load, as well as effective available power to change motion of the robot and/or its components (e.g. reducing the motion of the components and/or robot as a whole). The continuous safety zones can apply to any of the embodiments herein. For example, the dynamic safety zone can be a continuous dynamic safety zone over all or a portion of the motion profile. The motion profile can therefore include one or more continuous dynamic safety zones in conjunction with the demarcated dynamic safety zone as depicted in FIG. 4. In some forms the continuous dynamic safety zone can apply over the entirety of the motion profile.

The technique described in item 4) will be understood to include the ability to assess robot operations that have the dynamic safety zones (e.g. zones implemented using any one or a combination of the embodiments described above) and adjust motion planning to account for the effect of those zones. For example, if a robot is determined to have relatively large dynamic safety zones that are routinely "tripped" by regular and predictable intrusion of a person or foreign object, then the motion of the robot can be adjusted to account for that regular occurrence. For example, if a person enters the robot zone always on the robot's left side between the hours of 3:30 pm and 4:30 pm during a shift change, the robot can be programmed with a modified motion profile during those times and/or reprogrammed entirely to avoid that issue. If the robot routinely encroaches upon a concrete pillar in the workspace which causes routine slowdown of the robot as it traverses that space, the motion profile can likewise be adjusted. The motion profile can be adjusted using machine learning, but can also be adjusted manually by an operator.

Any of the embodiments above, or combination of embodiments, can include addition feature of adjusting the dynamic safe zone upon the type of object that is near the robot and/or the object that the robot is interacting with. For example, if the object is fragile or requires special care/handling the dynamic safe zone can be expanded to ensure safe operating conditions around the object. If the object is robust or does not require any special handling, the dynamic safe zone can be reduced. The function of the growth or shrinkage of the dynamic safe zone can thus be object dependent, and can additionally be dependent on the motion profile. To set forth just two nonlimiting examples, if the robot is maneuvering near a gallon of milk the dynamic safe zone may be expanded relative to the zone used when the robot is maneuvering near a book. In similar fashion, the dynamic safe zones may be adjusted based not only on an object that the robot is maneuvering near, but also can be adjusted based on the desired target of the robot (e.g. a target in which the robot is intended to grasp). In some forms the dynamic safe zone associated with the target can be expanded, or can be reduced/eliminated in other embodiments. The dynamic safe zone can thus be adjusted as a function of the motion profile, type of object in operational proximity to the robot, actuator conditions, deviation in motion profile, and/or sensor conditions, among other features described herein.

Figure 6:
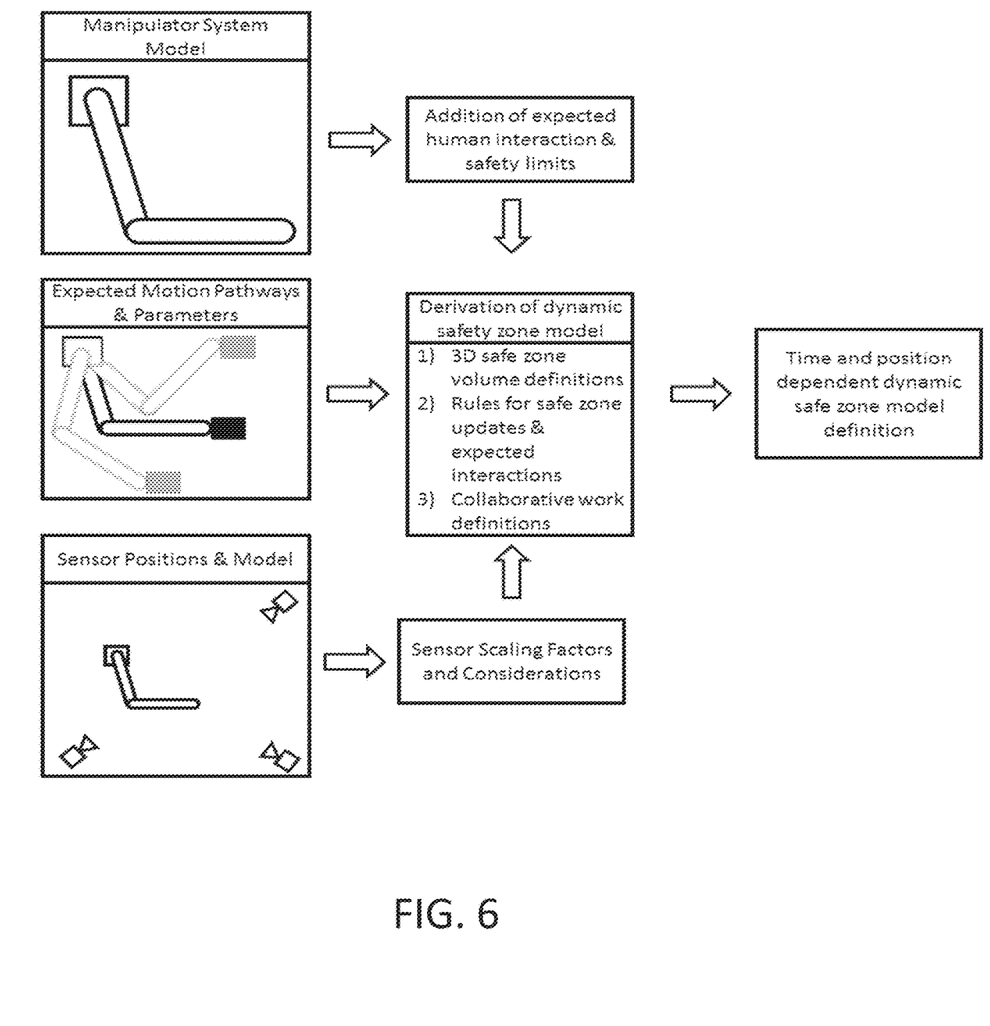
FIG. 6 depicts a flow chart of one embodiment of the formation of dynamic safety zones.

The various components of this system discussed above can work together to provide a derivation of a 3D time and position dependent model of safe zones and their associated rules. A diagram depicting the methods that can be used to generate this dynamic safety model is shown in FIG. 6.

Operation of the robot 50 can proceed autonomously after being initiated, either by an operator or another industrial process. The robot 50 can be controlled either from a local station or remote, which connection can be through any variety of mechanisms including RF signals, internet based communications, telephony, etc. To set forth just a few examples, the robot 50 can be controlled and/or monitored via WiFi, Ethernet, etc which can subsequently be displayed on a smart phone, tablet, desktop or laptop computer, etc. Data from the robot can be collected and analyzed, and in some forms historical archival data, either in whole or in part, can be stored.

In one aspect the instant application includes an apparatus comprising a robot having a moving component, and a safety system structured to dynamically update a safety zone around the moving component.

One feature of the present application includes wherein the safety zone is a volume defined around the moving component.

Another feature of the present application includes wherein the safety zone includes a plurality of zones.

Still another feature of the present application includes wherein the safety zone is dependent upon a property of a sensor.

Yet another feature of the present application includes wherein the property of the sensor is one of quality, resolution, data rate, and latency.

Yet still another feature of the present application further includes a controller which includes the safety system.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
a robot and a sensor used to assess a movement of the robot, the robot including an actuator structured to effect movement of the robot;
a controller configured to receive a data signal from the sensor and generate a control signal for the actuator to effect movement of the robot, the controller utilizing a dynamic safety zone characterized by an envelope useful to assess intrusion of an object into a space in proximity to the robot and thereafter reduce permissible movement speed of the robot as a function of the intrusion, the controller further structured to update the dynamic safety zone in real-time such that the envelope changes in reaction to changing conditions of the robot and/or the robot environment;
wherein the controller includes a motion profile used to define movement of the robot; and
wherein the envelope is a continuous envelope in which the furthest extent of the envelope from a robot reference corresponds to a maximum speed of the robot and the nearest extent of the envelope corresponds to a minimum speed of the robot.

2. The apparatus of claim 1, wherein the controller is structured to update the dynamic safety zone based upon a change in motion profile.

3. The apparatus of claim 2, wherein the dynamic safety zone is a function of a sensor characteristic, wherein the sensor characteristic includes at least one of a sensor accuracy, sensor sampling rate, and sensor latency.

4. The apparatus of claim 3, wherein the dynamic safety zone is a function of actuator performance, wherein the actuator performance is measured or estimated.

5. The apparatus of claim 1, wherein the envelope of the dynamic safe zone is a function of deviations in robot operations, wherein the deviations include at least one of a change in motion profile which results in a difference from an original motion profile, as well as changes in mass of a load which the robot is operating upon.

6. The apparatus of claim 5, wherein the dynamic safety zone is a function of a sensor characteristic, wherein the sensor characteristic includes at least one of a sensor reliability, sensor accuracy, sensor sampling rate, and sensor latency.

7. The apparatus of claim 6, wherein the dynamic safety zone is a function of actuator performance, wherein the actuator performance is measured or estimated.

8. The apparatus of claim 1, wherein the envelope of the dynamic safe zone is a function of actuator performance.

9. The apparatus of claim 8, wherein the dynamic safety zone is a function of a sensor characteristic, wherein the sensor characteristic includes at least one of a sensor reliability, sensor accuracy, sensor sampling rate, and sensor latency.

10. An apparatus comprising:
a robot and a first sensor used to assess a movement of the robot, the robot including an actuator structured to effect movement of the robot;
a controller configured to receive a data signal from the first sensor and generate a control signal for the actuator to effect movement of the robot, the controller utilizing a dynamic safety zone characterized by an envelope useful to receive information from the sensor and assess intrusion of an object into a space in proximity to the robot based on the sensor and thereafter reduce permissible movement speed of the robot as a function of the intrusion, the controller further structured to adjust the envelope on the basis of reliability of the first sensor.

11. The apparatus of claim 10, wherein the sensor reliability includes one of accuracy and sampling rate.

12. The apparatus of claim 11, which further includes a second sensor and a third sensor, and wherein the first sensor, second sensor, and third sensor generate data expressed in a common reference frame.

13. The apparatus of claim 12, wherein the envelope is a continuous envelope in which the furthest extent of the envelope from a robot reference corresponds to a maximum speed of the robot and the nearest extent of the envelope corresponds to a minimum speed of the robot.

14. The apparatus of claim 13, wherein the dynamic safety zone is a function of a sensor characteristic, wherein the sensor characteristic includes at least one of a sensor reliability, sensor accuracy, sensor sampling rate, and sensor latency.

15. The apparatus of claim 14, wherein the dynamic safety zone is a function of actuator performance, wherein the actuator performance is measured or estimated.

16. The apparatus of claim 10, wherein the controller is configured to include a statistics driven machine leaning engine such that a plurality of intrusions into the envelope are used to adjust the envelope.

17. The apparatus of claim 10, wherein the dynamic safety zone is adjusted to a first size based on a first object in operational proximity to the robot, and the dynamic safety zone is adjusted to a second size different than the first size based on a second object in operational proximity to the robot.

* * * * *